US009762502B1

(12) United States Patent
Mogul et al.

(10) Patent No.: US 9,762,502 B1
(45) Date of Patent: Sep. 12, 2017

(54) METHOD AND SYSTEM FOR VALIDATING RATE-LIMITER DETERMINATION MADE BY UNTRUSTED SOFTWARE

(71) Applicant: Google Inc., Mountain View, CA (US)

(72) Inventors: Jeffrey Clifford Mogul, Menlo Park, CA (US); Jakov Seizovic, Los Gatos, CA (US); Yuhong Mao, Fremont, CA (US); Benjamin Charles Serebrin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 14/632,449

(22) Filed: Feb. 26, 2015

Related U.S. Application Data

(60) Provisional application No. 61/991,855, filed on May 12, 2014.

(51) Int. Cl.
*G06F 15/16* (2006.01)
*H04L 12/863* (2013.01)
*H04L 12/825* (2013.01)

(52) U.S. Cl.
CPC ............ *H04L 47/624* (2013.01); *H04L 47/25* (2013.01)

(58) Field of Classification Search
CPC .................. H04L 47/624; H04L 47/25
See application file for complete search history.

(56) References Cited

U.S. PATENT DOCUMENTS

| | | | |
|---|---|---|---|
| 6,952,401 B1* | 10/2005 | Kadambi | H04L 47/125 370/232 |
| 6,987,733 B2* | 1/2006 | Mukouyama | H04L 12/5601 370/236 |
| 7,382,728 B2* | 6/2008 | Chen | H04L 12/5693 370/235 |
| 7,539,134 B1* | 5/2009 | Bowes | H04L 1/0072 370/230 |
| 7,636,308 B2* | 12/2009 | Kwon | H04L 43/0882 370/230.1 |
| 8,462,780 B2 | 6/2013 | Vincent et al. | |
| 8,477,610 B2 | 7/2013 | Zuo et al. | |
| 8,499,151 B2 | 7/2013 | Durham et al. | |

(Continued)

FOREIGN PATENT DOCUMENTS

| | | |
|---|---|---|
| WO | 2013158115 A1 | 10/2013 |
| WO | 2014021839 A1 | 2/2014 |

OTHER PUBLICATIONS

Radhakrishnan, et al., SENIC: Scalable NIC for End-Host Rate Limiting, 2013.

(Continued)

*Primary Examiner* — Krisna Lim
(74) *Attorney, Agent, or Firm* — Lerner, David, Littenberg, Krumholz & Mentlik, LLP

(57) ABSTRACT

The present application describes a system and method for a virtual machine to classify a packet. Once the virtual machine (VM) classifies the packet, it bypasses a hypervisor to enqueue the packet directly on a hardware transmission queue. The NIC will then verify that the VM classified and enqueued the packet correctly. If the packet was classified properly, it is transmitted over the wire to its destination. In this regard, the system and method provides a technique for verifying that the VM is enqueuing packets properly, while improving performance by allowing high-rate flows to bypass the hypervisor.

21 Claims, 9 Drawing Sheets

(56) References Cited

U.S. PATENT DOCUMENTS

| | | | |
|---|---|---|---|
| 8,566,822 B2 | 10/2013 | Diab et al. | |
| 8,599,830 B2 | 12/2013 | Karaoguz et al. | |
| 2004/0160914 A1 | 8/2004 | Sarkar | |
| 2005/0122966 A1* | 6/2005 | Bowes | H04L 12/5601 370/360 |
| 2008/0259798 A1 | 10/2008 | Loh et al. | |
| 2010/0061235 A1 | 3/2010 | Pai et al. | |
| 2010/0211946 A1 | 8/2010 | Elzur | |
| 2011/0019531 A1 | 1/2011 | Kim et al. | |
| 2011/0019552 A1 | 1/2011 | Karaoguz et al. | |
| 2011/0023029 A1 | 1/2011 | Diab et al. | |
| 2011/0103389 A1 | 5/2011 | Kidambi et al. | |
| 2012/0250511 A1* | 10/2012 | Neeser | H04L 47/12 370/235 |
| 2013/0019042 A1 | 1/2013 | Ertugay et al. | |
| 2013/0227685 A1* | 8/2013 | McGee | G06F 21/51 726/22 |
| 2013/0246619 A1 | 9/2013 | Raja et al. | |
| 2013/0343191 A1* | 12/2013 | Kim | H04L 47/11 370/235 |
| 2013/0343399 A1* | 12/2013 | Kandula | G06F 9/5077 370/412 |
| 2014/0115578 A1 | 4/2014 | Cooper et al. | |
| 2015/0146527 A1 | 5/2015 | Kishore et al. | |
| 2016/0044695 A1 | 2/2016 | Gunner | |
| 2016/0301601 A1* | 10/2016 | Anand | H04L 69/22 |

OTHER PUBLICATIONS

Radhakrishnan, et al., NicPic: Scalable and Accurate End-Host Rate Limiting, 2013.

Broadcom Ethernet Network Controller Enhanced Virtualization Functionality, Broadcom Corporation, Oct. 2009.

Keller, Eric, et al., NoHype: Virtualized Cloud Infrastructure without the Virtualization, Princeton University, © 2010.

Ram, Kaushik Kumar, et al., sNICh: Efficient Last Hop Networking in the Data Center, HP Laboratories, © 2010.

Mogul, Jeffrey C., et al., The NIC is the Hypervisor: Bare-Metal Guests in IaaS Clouds, HP Labs, Palo Alto, 2013.

* cited by examiner

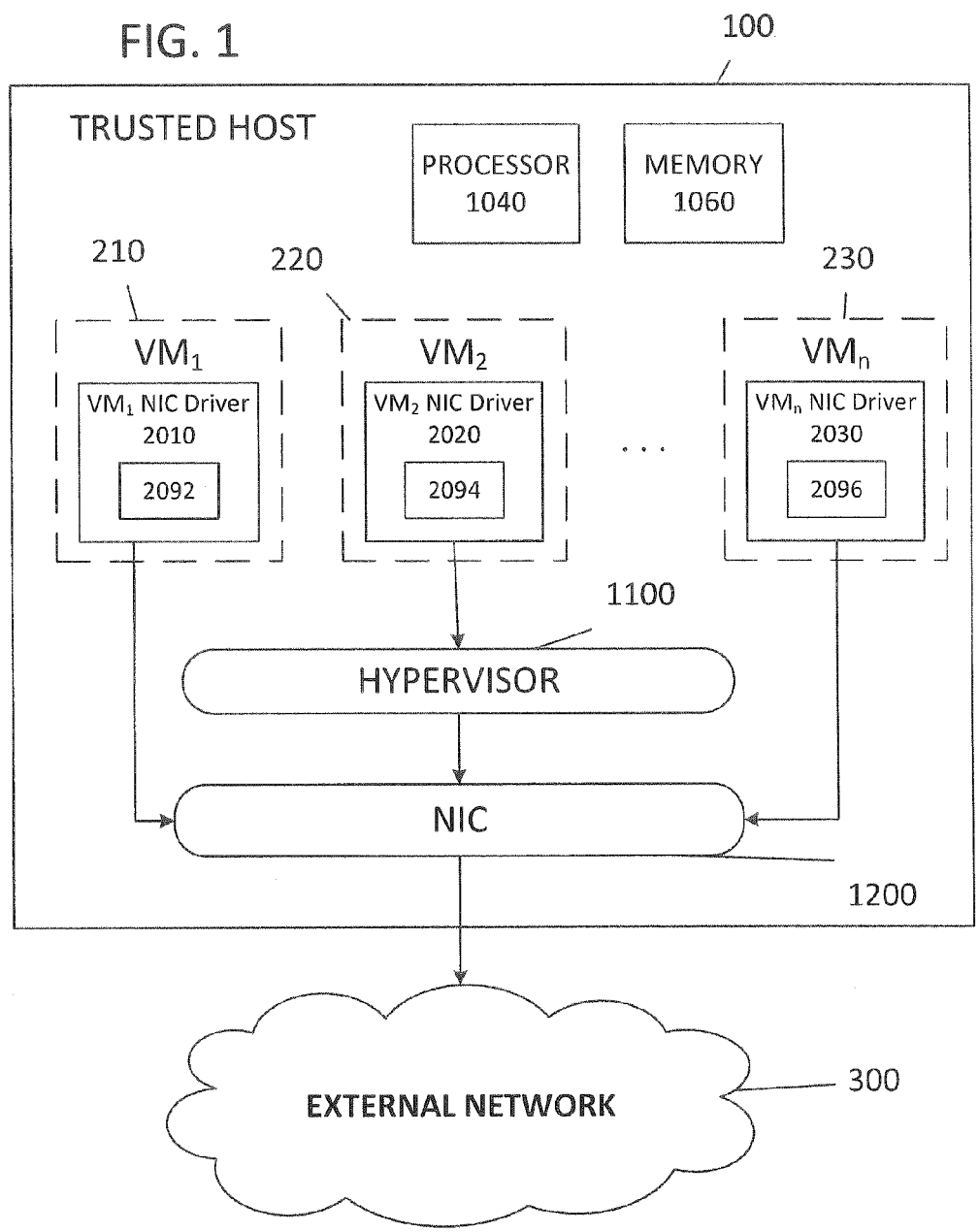

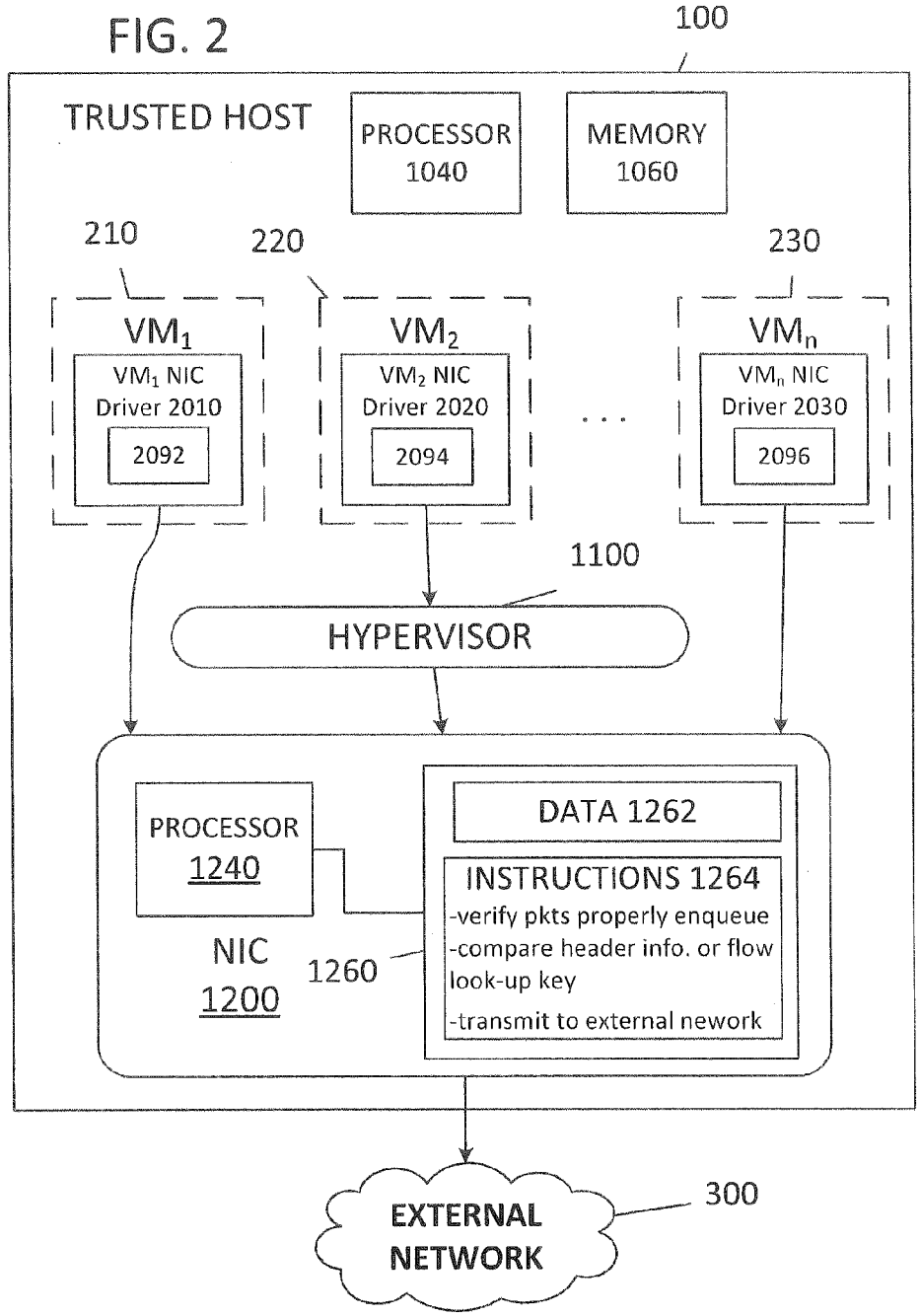

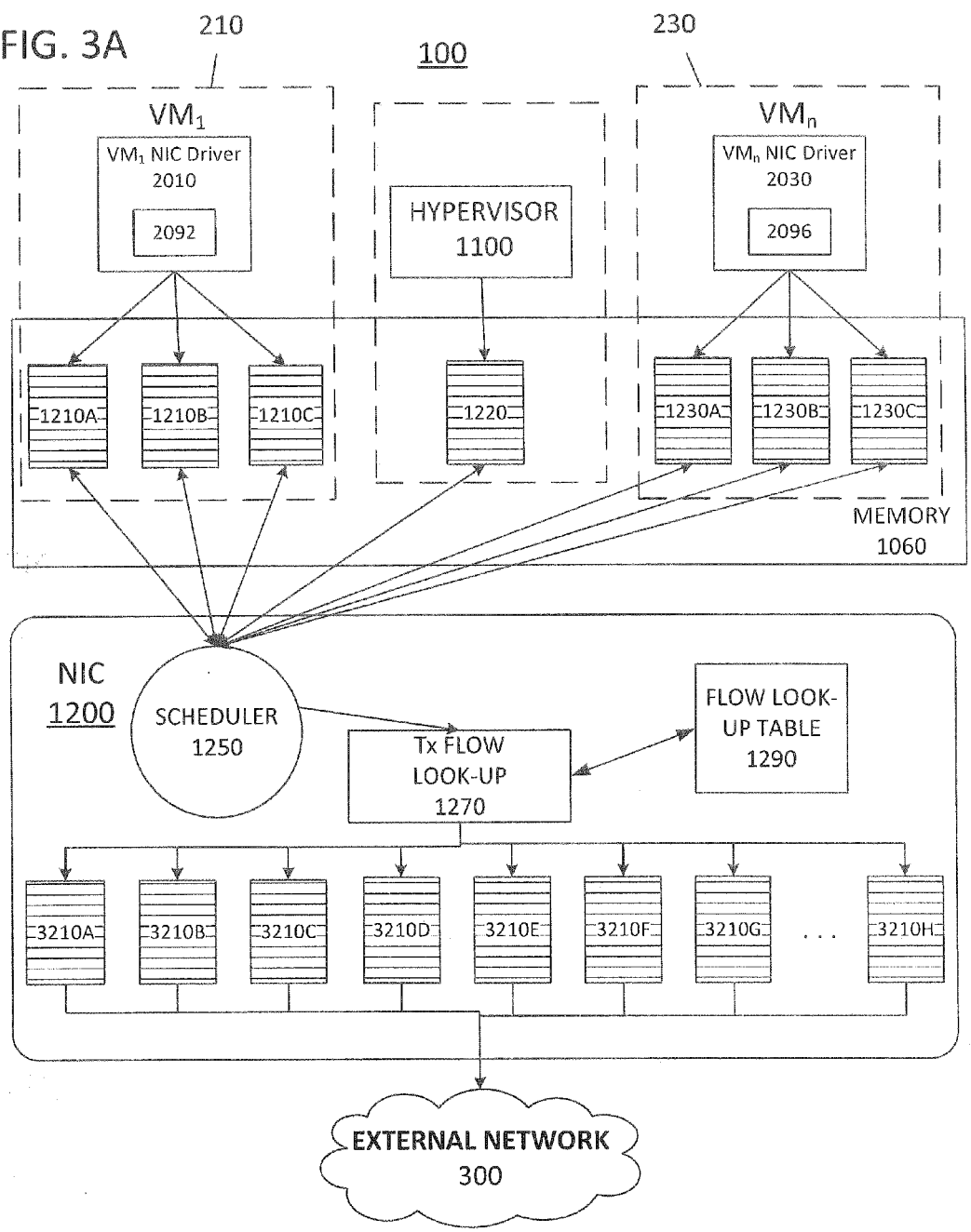

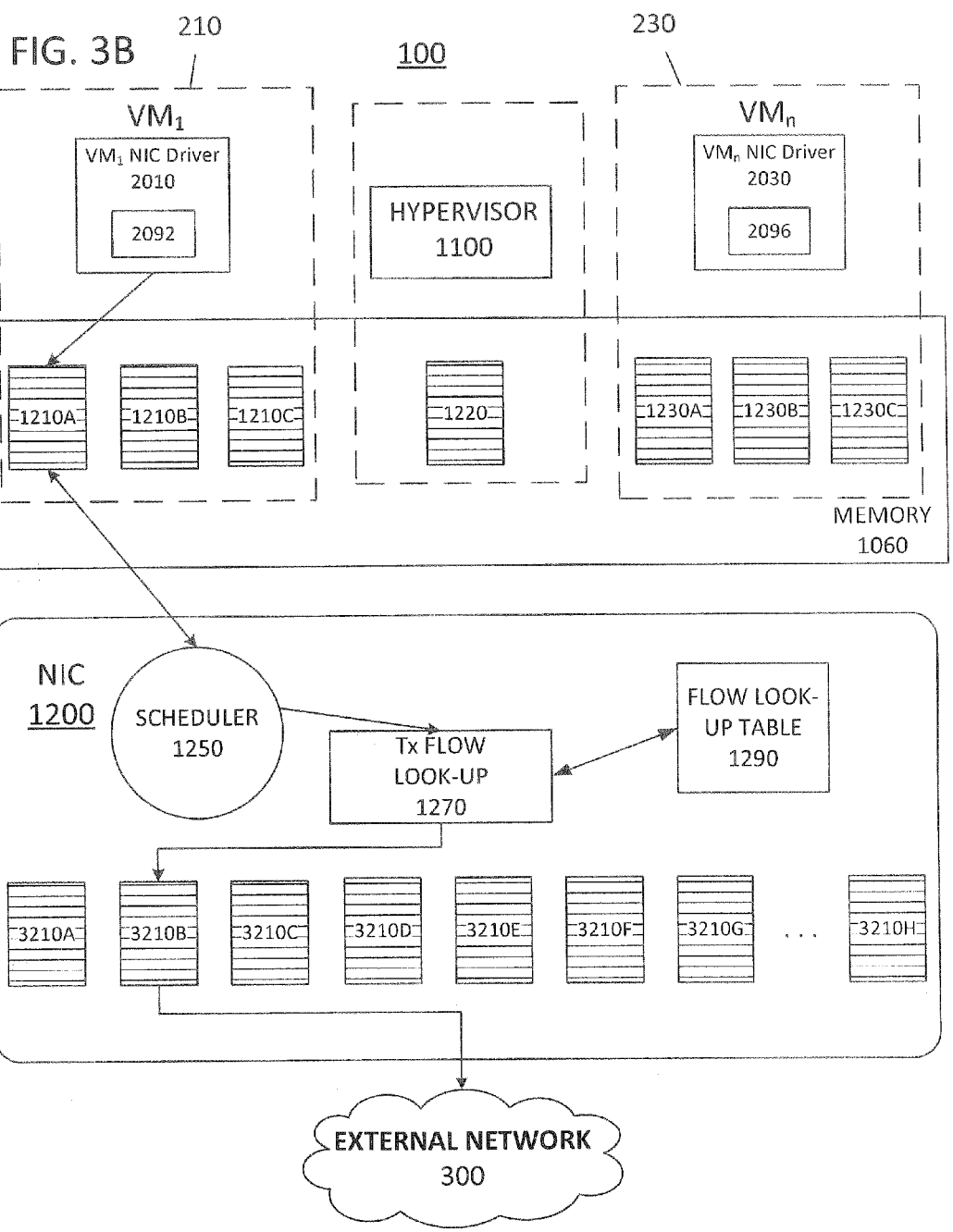

FIG. 4B
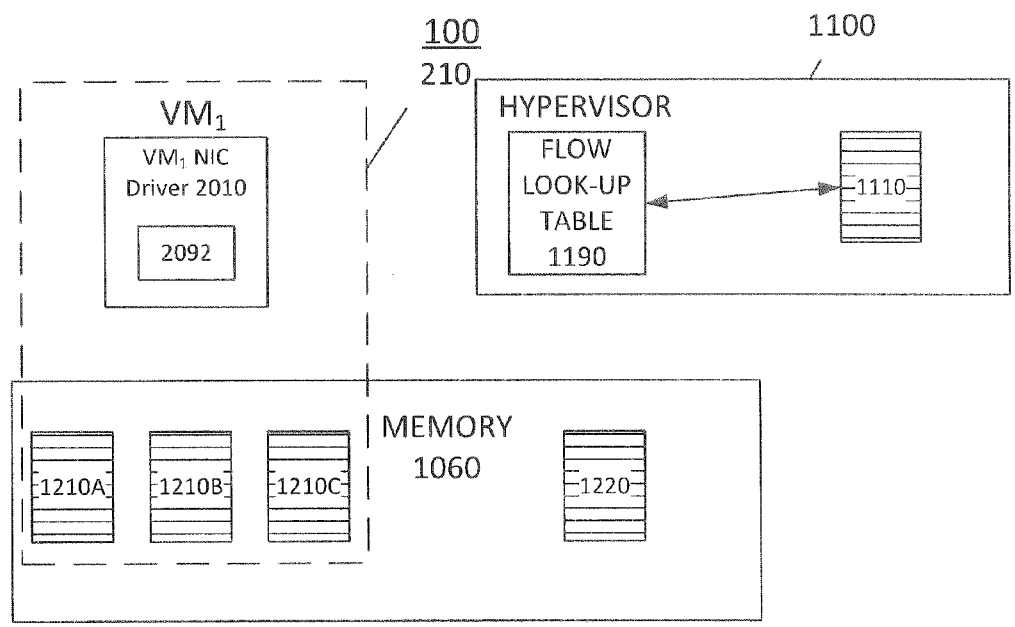
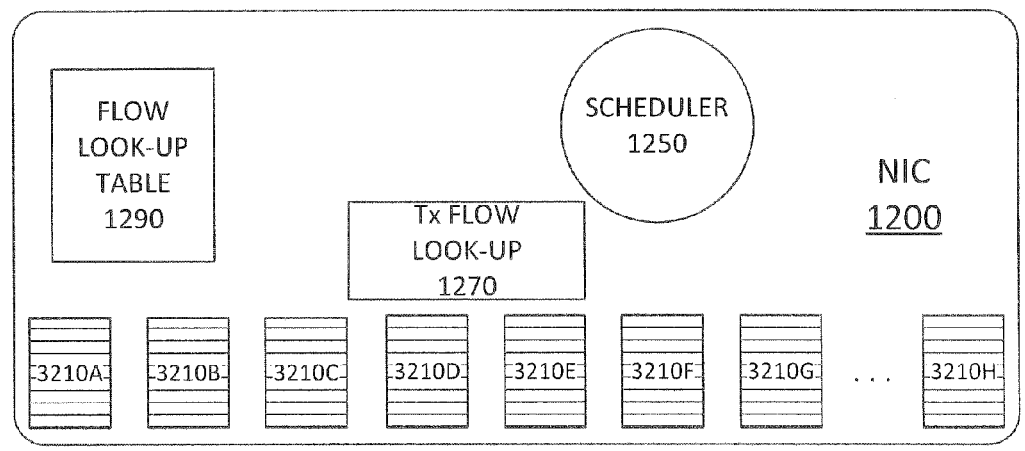
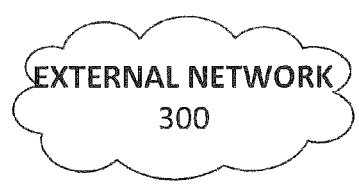

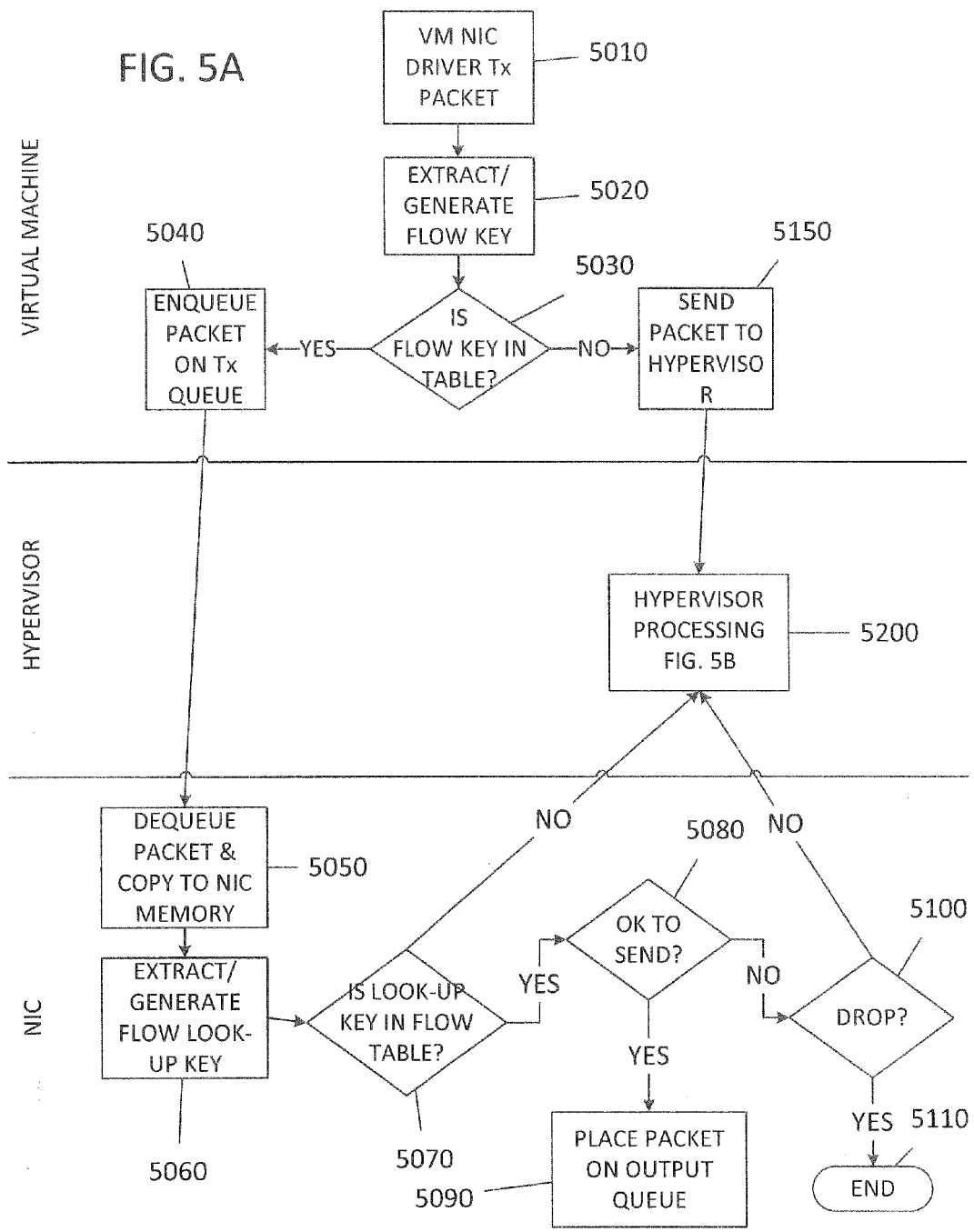

METHOD AND SYSTEM FOR VALIDATING RATE-LIMITER DETERMINATION MADE BY UNTRUSTED SOFTWARE

CROSS-REFERENCE TO RELATED APPLICATIONS

This application claims priority to provisional application No. 61/991,855, entitled "Method and System for Validating Rate-Limiter Determination Made by Untrusted Software," filed on May 12, 2014, the disclosure of which is herein incorporated by reference herein in its entirety.

This application is also related to commonly owned co pending U.S. application Ser. No. 14/632,464, entitled "Method and System for Enforcing Multiple Rate Limits with Limited On-Chip Buffering," the disclosure of which is hereby incorporated by reference herein in its entirety.

BACKGROUND

In systems that include a plurality of virtual machine environments, trusted host software, such as a hypervisor or virtual machine manager, is needed to manage network resources. In particular, these virtual machines are required to share network bandwidth. In order to enforce bandwidth sharing amongst the virtual machines, a trusted host may implement rate limiting.

Rate limiting is a technique used to limit traffic sent and received by the virtual machines. In particular, there are two types of rate-limiting: hardware rate limiting and software rate limiting.

Hardware rate limiting is performed by a network interface controller (NIC). In this regard, a limited number of hardware transmission queues are supported by the NIC. In transmitting a packet, the operating system will transmit a packet to the NIC, thereby notifying it of the packet and the appropriate transmission buffer to use. The NIC will subsequently decide the order in which the received packets are transmitted. However, the limited number of hardware transmission queues do not scale well and require a large amount of memory, which increases the cost associated with hardware rate limiting.

Software rate limiting is typically performed by a hypervisor. In this regard, a plurality of software transmission queues are provided in the hypervisor. The hypervisor receives packets from the virtual machines and transmits them to the NIC in batches based on rate limiting classification. In this regard, the packet flow and other rate limiting policies are enforced by the hypervisor. This results in high overhead with the trusted host's processor. Additionally, the hypervisor does not have control of the packets once they are transmitted to the NIC, so packets may be transmitted out-of-order or at unpredictable times.

SUMMARY

The present application describes a system and method that includes a trusted host with a plurality of virtual machines (VMs). The trusted host includes a processor, a memory including a plurality of rate limited transmission queues, at least one hypervisor, and at least one network interface controller (NIC). The NIC includes at least a processor, a scheduler, a memory containing a plurality of hardware transmission queues, and at least one connection to an external network. The hypervisor exposes a plurality of rate limited transmission queues to the virtual network interface controller (vNIC) virtual device of the virtual machine. In this regard, the hypervisor allocates the rate-limited transmission queues to the virtual machines as needed. Additionally, each virtual machine's device driver is further provided with a transmission look-up table.

When the virtual machine transmits a packet, the VM network interface controller (NIC) driver will classify the packet according to the transmission look-up table. If an entry for the packet exists in the VM NIC driver's transmission look-up table, the VM NIC driver will bypass the hypervisor and enqueue the packet on the appropriate rate limited hardware transmission queue. If no entry exists, then the VM NIC driver will transmit the packet to the hypervisor to be classified and transmitted.

The scheduler dequeues packets from the hardware transmission queues assigned to the virtual machines and places it in a high-speed memory of the NIC. The NIC's processor then verifies that the packet was placed on the appropriate transmission queue. If it was, the packet is re-enqueued on a hardware output queue to be transmitted over a network. In this regard, the NIC verifies that the virtual machine is enqueuing packets properly, thereby improving performance by allowing high-rate flows to bypass the hypervisor.

If the packet was not classified properly by the vNIC, the NIC's processor may reroute the packet to the hypervisor for further processing or drop the packet. Additionally, the VM that attempted to take advantage of the hypervisor bypass may be disciplined, such as losing the ability to bypass the hypervisor or a readjustment of rate-limit allocated to the VM.

The present application describes a computer-implemented method that receives a packet on a rate limited hardware transmission queue from a virtual machine device driver. The packet is then verified, using one or more processors of a network interface controller (NIC), to determine whether the virtual machine device driver placed the packet on a proper rate limited hardware transmission queue.

According to one example, verifying whether the virtual machine device driver placed the packet on the proper rate limited hardware transmission queue is done by referring to an entry in a classification table managed by trusted host software. In some examples, the entry is indexed based upon at least a portion of header information of the packet.

Additionally, the NIC may also determine whether the virtual machine is authorized to send the packet.

For example, determining whether the virtual machine is authorized to send the packet may include determining whether the virtual machine has exceeded a first threshold. In some examples, the first threshold may be an amount of bandwidth allocated to the virtual machine.

According to another example determining whether the virtual machine is authorized to send the packet includes checking an access control list.

When the NIC determines that the packet was not placed on the proper rate limited transmission queue, the packet may be dropped.

When the NIC has determined that the packet was not placed on the proper rate limited hardware transmission queue, a right of a virtual machine to bypass a hypervisor may be rescinded.

When the NIC has determined that the packet was placed on the proper rate limited hardware transmission queue, the packet is transferred to one of a plurality of hardware output queues.

According to some examples, the rate limited hardware transmission queue may be for packets intended for a specific destination.

The present application also describes a system that includes at least one rate limited transmission queue that receives at least one packet from a virtual machine device driver. The system also includes a processor that verifies that the virtual machine device driver placed the packet on a proper rate limited hardware transmission queue.

According to some examples, the system includes a transmission flow look-up table managed by a trusted host software.

The processor may determine whether the virtual machine is authorized to send the packet. For example, the processor may determine whether the virtual machine has exceeded a first threshold, such as an amount of bandwidth allocated to the virtual machine.

According to other examples, the processor may determine whether the virtual machine is authorized to send the packet by checking an access control list.

The processor drops the packet when it determines that the virtual machine device driver did not place the packet on the proper rate limited hardware transmission queue.

In another example, the processor notifies a hypervisor when the NIC has determined that the packet was not placed on the proper rate limited hardware transmission queue. In this regard, the hypervisor may rescind a right of the virtual machine to bypass a hypervisor.

The current application also describes a non-transitory computer readable medium that includes that receive a packet on a rate limited hardware transmission queue from a virtual machine device driver. The instructions further include verifying, using one or more processors of a network interface controller (NIC), whether the virtual machine device driver placed the packet on a proper rate limited hardware transmission queue.

As noted above, one of the advantages of the system, method, and non-transitory computer-readable medium described herein is realized by verifying that the VM's driver is enqueuing packets on the appropriate transmission queue. The present application describes systems and methods that optimize network flows, while ensuring that the VMs adhere to the rate limits set by the trusted host. Further advantages will be realized by the various examples described herein and will be apparent from the following detailed description.

BRIEF DESCRIPTION OF THE DRAWINGS

FIG. 1 illustrates a schematic of virtual machines bypassing the hypervisor;

FIG. 2 illustrates a schematic of virtual machines bypassing the hypervisor with additional components of the Network Interface Controller;

FIGS. 3A and 3B show the virtual machines bypassing the trusted host hypervisor according to one example;

FIGS. 4A-4C show an example of a hypervisor handling a packet that was classified improperly by the virtual machine; and FIGS. 5A and 5B show a flowchart for the processing of packets.

DETAILED DESCRIPTION

Figure 4A:
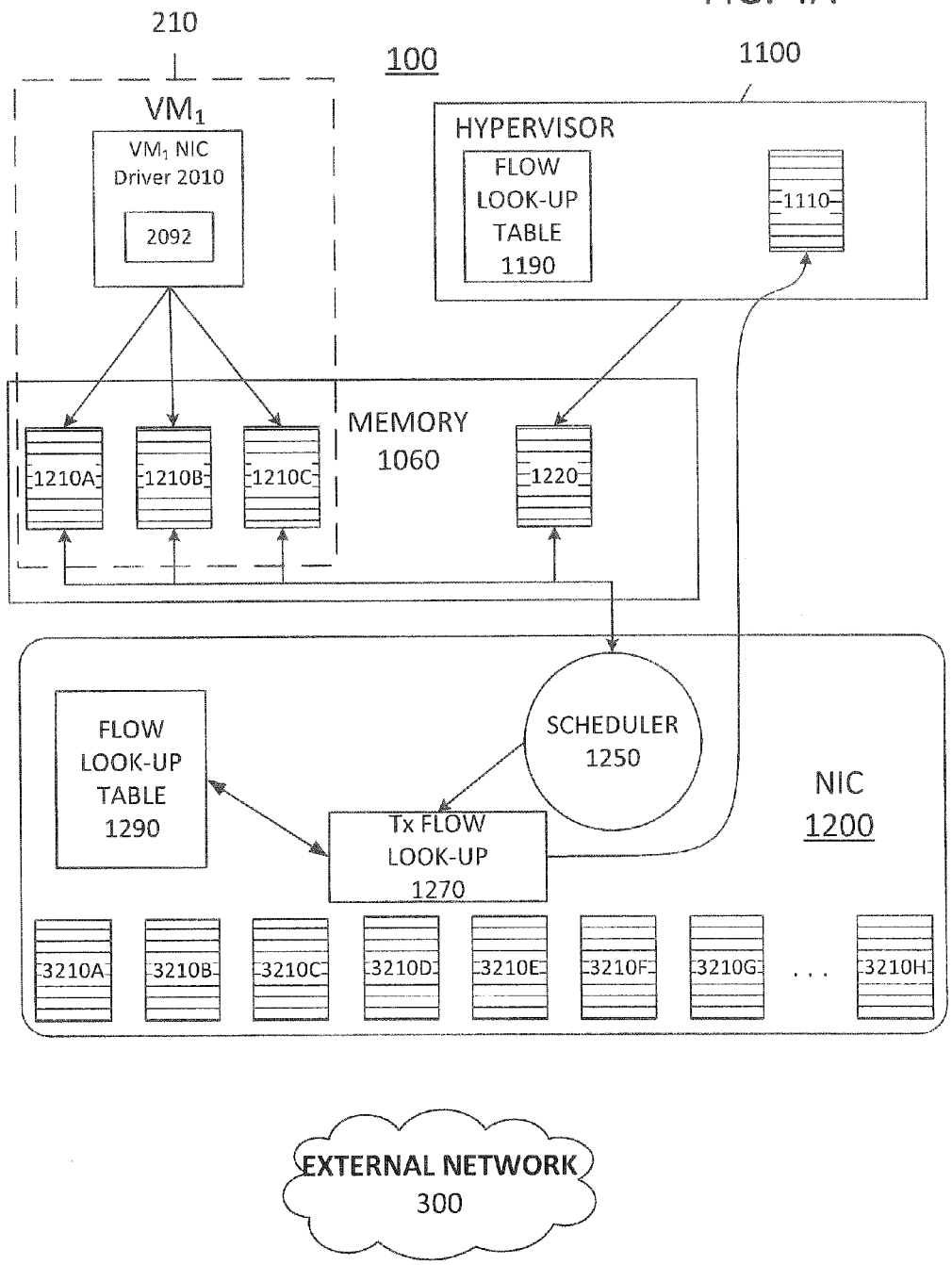

The present disclosure relates to a system and method for a virtual machine (VM) classifying a packet and bypassing a hypervisor to enqueue the classified packet on a rate-limited transmission queue. The NIC may verify the virtual machine's classification.

In conventional virtual machine environments, virtual machines transmit packets to a hypervisor, which then classifies and enqueues the packet on a transmission queue of the NIC. This is a resource intensive process. To address this problem, some systems allow the virtual machine to bypass the hypervisor and enqueue the packet on the appropriate rate limited transmission queue. However, some VMs will attempt to take advantage of the system by enqueuing packets improperly, for example on a transmission queue with a higher rate limit. Verifying that the virtual machine is enqueuing packets properly when bypassing the hypervisor allows for improved performance by allowing high-rate flows to bypass the hypervisor while providing a mechanism that allows the NIC to verify the VM's classification.

According to the examples described herein, a virtual machine includes a virtual device driver. When the virtual device driver receives a packet from the VM, it uses header information of the packet to refer to a flow look-up table to determine a proper transmission queue. If the packet's header information matches an entry in a flow look-up table of the virtual device driver, the entry is reviewed to determine information that indicates the appropriate transmission queue for the packet. The packet is subsequently enqueued on the appropriate rate-limiting transmission queue. If the header information does not match an entry in the flow look-up table, the packet is routed to a hypervisor for further processing.

The packet that was enqueued on the transmission queue is subsequently dequeued by the NIC's scheduler and placed in the NIC's memory, such as an SRAM buffer. In this regard, the dequeuing is subject to the transmission queue's rate limit before it is dequeued. Further, the hypervisor, and not the VM, is able to set the rate limit for each transmission queue. The NIC then verifies that the virtual device driver classified the packet properly. If the packet has been properly classified by the virtual device driver, the packet may be re-enqueued on an output queue to be transmitted to its intended destination. In certain embodiments, the NIC may perform additional processing on the packet, such as checking an access control list, before transmitting the packet.

When the packet was not properly enqueued by the virtual device driver, the NIC will either drop the packet or route it to the hypervisor. In some examples, how the NIC handles mis-queued packets may be controlled by a hypervisor-controlled configuration flag associated with each queue. In alternative examples, the configuration flag may have a global effect on how the NIC handles mis-queued packets for every queue. When the configuration flag indicates that mis-queued packets are to be re-routed to the hypervisor and the hypervisor's queue is full, the NIC may drop the packet out of necessity.

When the hypervisor receives a packet, either from the virtual device driver or the NIC, it will process the packet to determine the appropriate rate-limited transmission queue to assign the packet. In this regard, the hypervisor determines whether the flow is in its master transmission flow table. If the packet is not in the master transmission flow table, then the hypervisor processes the packet according to appropriate policies.

However, if the packet is in the master transmission flow table, the hypervisor determines if the flow is allowed. If the flow is allowed, the hypervisor determines whether it should be handled by an appropriate rate-limited queue of the NIC or whether the flow should have its own entry in the master transmission flow table.

Determining when to include a flow in the master transmission flow table, and therefore the VM device driver's flow table and the NIC's flow table, takes into consideration several factors. In this regard, the NIC's flow table is kept in relatively expensive and small memory, such as SRAM. As such, low-rate or short-duration flows should not consume a slot in the NIC's flow table. Therefore, the hypervisor should decide whether an entry needs to be created for a flow according to which entries should be kept in the NIC's flow table using any of a variety of well-known cache management algorithms. If the hypervisor decides not to maintain a NIC-table entry for a flow, then the hypervisor does not allocate a rate-limited transmission queue to the VM for this flow. However, if the hypervisor determines that a NIC-table entry should be maintained for the flow, then an entry is created in the hypervisor master transmission flow table and the flow tables of the virtual device driver and NIC are updated accordingly.

Accordingly, the trusted host system verifies that the VM is enqueuing packets on the appropriate rate-limited transmission queues. Further, the trusted host system provides for allocation and management of rate-limited queues for both the virtual machine and individual flows out of the VM.

FIG. 1 illustrates a virtual machine (VM) environment where the virtual machines (VMs) may bypass a hypervisor to transmit packets to an external network. In this regard, the VM environment includes at least one trusted host 100 connected to an external network 300. Although only one trusted host 100 is shown in FIG. 1, one of ordinary skill in the art would recognize that several trusted hosts may exist in a data center or server farm. The trusted host includes a plurality of virtual machines (VMs) 210, 220, and 230, a hypervisor 1100, and a network interface controller (NIC) 1200. The trusted host 100 may also include at least one processor 1040 and at least one memory 1060.

The trusted host 100 may be any type of computing device capable of hosting VMs. In this regard, the trusted host 100 may be a server, preferably one located in a server farm or a data center. The processor 1040 of the trusted host 100 may be any conventional processor, such as processors from Intel Corporation or Advanced Micro Devices. Alternatively, the processor may be a dedicated controller such as an application specific integrated circuit (ASIC), field programmable gate array (FPGA), etc. Additionally, the processor 1040 of the trusted host 100 may include multiple processors, multi-core processors, or a combination thereof. Accordingly, references to a processor will be understood to include references to a collection of processors or dedicated logic that may or may not operate in parallel.

The memory 1060 of the trusted host stores information accessible by the processor, including instructions and data that may be executed or otherwise used by the processor. The memory 1060 may also store the trusted host's operating system and the hypervisor 1100. Additionally, the memory 1060 may store a number of rate limited transmission queues to be allocated to each of the VMs. In this regard, the memory 1060 may be of any type of memory capable of storing information accessible by the processor, including a computer-readable medium, or other medium that stores data that may be read with the aid of an electronic device, such as a hard-drive, memory card, flash drive, ROM, RAM, DRAM, DVD or other optical disks, as well as other write-capable and read-only memories. In that regard, the memory 1060 may include short term or temporary storage as well as long term or persistent storage. Systems and methods may include different combinations of the foregoing, whereby different portions of the instructions and data are stored on different types of media.

In operation, the trusted host 100 may run an operating system that manages the VMs. In this regard, the operating system includes a hypervisor, such as hypervisor 1100, or a virtual machine manager (VMM). For the purposes of this application, hypervisor and VMM may be used interchangeably. Further, one of ordinary skill in the art would recognize that the operating system of the trusted host 100 may be Linux, Windows™, or any other suitable operating system capable of supporting virtual machines.

The hypervisor 1100 may manage each VM such that the VMs appear to be isolated from one another. That is, each VM 210, 220, and 230 believes itself to be an independent machine with its own hardware resources. In this regard, the hypervisor 1100 may control the VMs access to the trusted host's resources (i.e. memory, network interface controller, etc.). The hypervisor 1100 implements a hardware virtualization scheme that allocates hardware resources to the VMs as necessary. According to some examples, the NIC 1200 is one of the hardware resources that VMs 210, 220, and 230 interact with via the hypervisor 1100.

The VMs 210, 220, and 230 are software implementations of a computer. That is, VMs 210, 220 and 230 execute an operating system. While only three VMs are shown in the figures, one of ordinary skill in the art would recognize that any number of VMs may be supported by the trusted host 100. The operating system of the various VMs 210, 220, and 230 may be the same operating system as the trusted host, but do not necessarily have to be. Moreover, the operating system of each VM may be different from other VMs. For example, the trusted host 100 may run a Linux-based operating system, while the VM 210 may run a Windows™ operating system and the VM 220 may run a Solaris™ operating system. The various combinations of operating systems would be readily apparent to those skilled in the art and are not discussed in greater detail herein.

Each VM includes its own virtual network interface controller (vNIC) driver 2010, 2020, and 2030. Each vNIC driver 2010, 2020, and 2030 may include a transmission look-up table 2092, 2094, 2096, respectively. In this regard, each look-up table may be configured to address the flows of its associated VM. The vNICs may transmit and receive packets for the VM. In this regard, the vNICs may format or otherwise prepare the packet for transmission on the external network 300.

External network 300 may comprise various configurations and use various protocols including the Internet, World Wide Web, intranets, virtual private networks, local Ethernet networks, private networks using communication protocols proprietary to one or more companies, cellular and wireless networks (e.g., WiFi), data center networks, and various combinations of the foregoing. Although only one trusted host is depicted in FIG. 1, it should be appreciated that a typical system can include a large number of connected computers, trusted hosts, and VMs.

In operation, the VMs 210, 220, and 230 of FIG. 1 communicate with other destinations (i.e., other VMs, physical machines, servers, storage arrays, etc.). In this regard, the VMs 210, 220, and 230 may transmit packets using drivers 2010, 2020, and 2030, respectively. For example, the VM's driver 2010 receives a packet from the operating system of VM 210. The VM's driver generates a transmission flow look-up key from the received packet. Generating transmission flow look-up keys will be discussed in greater detail below. The VM's driver 2010 then compares the generated transmission flow look-up key to the entries in the transmission look-up table 2092.

If the generated flow look-up key does not match an entry in the transmission look-up table 2092, the VM's driver 2010 transmits the packet to the hypervisor 1100 to be handled as discussed below.

If the generated flow look-up key matches an entry in the transmission look-up table 2092, then the entry is further evaluated to determine which rate limited transmission queue the packet should be enqueued. The VM driver 2010 then bypasses the hypervisor and enqueues the packet directly on a rate limited transmission queue based on the entry in transmission look-up table 2092. The NIC may subsequently perform a check on the packet to verify that the VM driver enqueued the packet properly before transmitting it to external network as discussed in greater detail below.

Turning to FIG. 2, an example of the hypervisor bypass is shown. In this regard, the system includes a trusted host 100 and external network 300 as discussed above. Similarly, the trusted host 100 includes at least one processor 1040, at least one memory 1060, VM 210, VM 220, VM 230, a hypervisor 1100, and a NIC 1200. Each VM includes its own virtual driver 2010, 2020, and 2030, and each virtual driver 2010, 2020, and 2030 may include a transmission flow-look-up table 2092, 2094, and 2096, respectively. According to this example, the NIC is shown with a processor 1240 and memory 1260, which may include data 1262 and instructions 1264. Processor 1240 may be one of the processors discussed above or a combination thereof. In other examples, the processor 1240 may be fixed-function hardware configured to perform the examples described herein. Additionally, memory 1260 may be any type of memory previously discussed or a combination thereof. While only one memory is shown in FIG. 2, one of ordinary skill in the art will appreciate that this is merely illustrative and the NIC 1200 may include additional memories of varying types.

The instructions 1264 may be any set of instructions to be executed directly (such as machine code) or indirectly (such as scripts) by the processor 1240. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. The instructions may be executed to, for example, dequeue packets from the rate limited transmission queues, verify that the VM classified the packet properly, re-queuing packets on output queues, etc. Functions, methods and routines of the instructions are explained in more detail below.

The data 1262 may be retrieved, stored or modified by processor 1240 in accordance with the instructions 1264. For instance, although the system and method are not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

Turning to FIG. 3A, an example of the hypervisor bypass and the various communication paths are shown. In this regard, the system includes a trusted host 100 and external network 300 as discussed above. Similarly, the trusted host 100 includes at least one processor (not shown), the memory 1060, VM 210, VM 220, VM 230, a hypervisor 1100, and a NIC 1200. As shown in FIG. 3A, the memory 1060 may include a plurality of rate limited hardware transmission queues 1210A 1210B, 1210C, 1220, 1230A, 1230B, and 1230C. The NIC 1200 may include a scheduler 1250, a transmission flow-look-up 1270, a flow look-up table 1290, and a plurality of output queues 3210.

According to some example, the memory 1060 of the trusted host 100 may include a plurality of rate limited transmission queues 1210A 1210B, 1210C, 1220, 1230A, 1230B, and 1230C. In this regard, the transmission queues 1210A, 1210B, and 1210C may be stored in memory 1060 that has been allocated to VM 210. Further, the transmission queues 1230A, 1230B, and 1230C may be allocated in memory 1060 that has been allocated to VM 230. Additionally, the transmission queue 1220 may be stored in the memory 1060 allocated to the hypervisor 1100. The transmission queues stored in the memory 1060 may be first-in first-out type of queues, or another type of transmission queue, such as last-in first-out or a transmission ring buffer. According to some examples, the memory 1060 may be dynamic random access memory (DRAM), or any other suitable high-speed volatile memory may be used. The high-speed volatile memory 1060 is capable of holding more than 10,000 rate limited transmission queues. In this regard, the NIC 1200 exposes the plurality of rate limited hardware transmission queues to the VMs.

In operation, the rate limited transmission queues 1210A, 1210B, and 1210C may be assigned to the VM 210. Further, the rate limited transmission queues 1230A, 1230B, and 1230C may be allocated to the VM 230. Transmission queue 1220 is assigned to the hypervisor 1100, and receives packets that have been software rate-limited by the hypervisor. These packets are ready for immediate transmission. While FIG. 3A only shows three transmission queues assigned to each VM, one of ordinary skill in the art would recognize that each VM may have more or less transmission queues assigned thereto as determined by the hypervisor or the NIC. Additionally, the hypervisor 1100 may have more than one rate limited transmission queue assigned thereto. For example, the hypervisor may have a hypervisor-owned queue for each VM.

As noted above, the NIC 1200 includes the scheduler 1250, which may employ any type of scheduling algorithm, such as round-robin. In this regard, the scheduler may dequeue packets from the transmission queues 1210, 1220, and 1230 so the NIC may determine whether they were enqueued properly by the VM driver.

The transmission flow look-up 1270 of the NIC 1200 may also include a memory, such as an SRAM buffer or any other suitable high-speed memory. In some examples, transmission flow look-up 1270 may include instructions for comparing a flow look-up key to entries in a transmission flow look-up table 1290.

The transmission flow look-up table 1290 may be any suitable table or database capable of indexing and storing information for classifying the appropriate rate limited transmission queue for the packet. The transmission flow look-up table may be stored in a memory of the NIC, such as a content addressable memory (CAM), ternary content addressable memory (TCAM), SRAM, DRAM, or any other suitable memory. In this regard, the transmission flow look-up 1270 may use the transmission flow look-up table 1290 to determine whether the flow look-up key is stored therein.

As noted above, the rate limited hardware transmission queues 1210A, 1210B, and 1210C are allocated to VM 210.

Additionally, the rate limited hardware transmission queues 1230A, 1230B, and 1230C are allocated to VM 230. In this regard, FIG. 3A shows the various data paths that packets may traverse to reach the external network 300.

Each rate limited transmission queue 1210A, 1210B, and 1210C may have a different class of traffic, destination, or priority associated therewith. Similarly, the rate limited transmission queues 1230A, 1230B, and 1230C may also have different classes of traffic, destinations, or priorities associated with each queue. Each rate limited hardware transmission queue may be dedicated to a particular class of network traffic, a priority associated with the network traffic, a specific destination (i.e. particular machines, another trusted host with a plurality of virtual machines, a storage area network, a specific data center, etc.) or any combination thereof.

While only three rate limited hardware transmission queues are shown as being allocated to each VM, one of ordinary skill will appreciate that this is merely illustrative and more or fewer rate limited hardware transmission queues may be exposed to the VM as necessary. Allocating rate limited hardware transmission queues will be discussed below with respect to FIG. 5.

FIG. 3B illustrates the rate limited hardware transmission queue 1220 being allocated to the hypervisor 1100. One of ordinary skill in the art would recognize that additional rate limited hardware transmission queues could be allocated to the hypervisor 1100 as appropriate.

In operation, the operating systems of the VMs 210, 220, and 230 transmit packets using VM drivers 2010, 2020, and 2030, respectively. For example, the VM driver 2010 receives a packet from the operating system of VM 210. The VM driver generates a transmission flow look-up key from the received packet. Generating transmission flow look-up keys will be discussed in greater detail below. The VM driver 2010 then compares the generated transmission flow look-up key to the entries in the transmission look-up table 2092.

If the generated flow look-up key does not match an entry in the transmission look-up table 2092, the VM driver 2010 transmits the packet to the hypervisor 1100 to be handled as discussed in greater detail below.

If the generated flow look-up key matches an entry in the transmission look-up table 2092, then the entry is further evaluated to determine which rate limited transmission queue on which to enqueue the packet. VM driver 2010 then bypasses the hypervisor and enqueues the packet directly on one of the rate limited hardware transmission queues 1210A, 1210B, or 1210C.

FIG. 3B illustrate one example of a VM enqueuing a packet on a proper rate limited transmission queue. In FIG. 3B, the VM driver 2010 enqueues a packet on the rate limited hardware transmission queue 1210A. One of ordinary skill in the art would recognize that this is merely illustrative and that the VM driver may enqueue the packet on either rate limited hardware transmission queues 1210B or 1210C. In some examples, the VM driver 2010 will transmit the packet to hypervisor 1100 if it does not match any entries in the transmission look-up table 2092.

As shown in FIG. 3B, the scheduler 1250 may dequeue packets from the transmission queues 1210, 1220, and 1230 according to any known scheduling algorithm after the queue's associated rate-limiter has released the packet. In this regard, the packets are moved from their respective transmission queue to a memory (i.e. on-chip buffer or SRAM) to generate the flow look-up key. Transferring the packet from the transmission queue may involve a direct memory access from the DRAM where the transmission queue is located to the high-speed memory of the NIC. The scheduler 1250 may place at least a portion of the packet in the high-speed memory of the NIC 1200. According to this example, the portion of the packet may be used as the transmission flow look-up key.

In this regard, a processor of the NIC 1200 may generate a flow look-up key as described in greater detail below. The flow look-up key may then be compared to the entries stored in the flow look-up table 1290 to determine whether the VM enqueued the packet properly (i.e., on the correct rate limited transmission queue). If the flow look-up key does not match any of the entries in the flow look-up table 1290, the NIC 1200 will take appropriate action, such as dropping the packet or routing the packet to the hypervisor 1100 for further processing, as discussed further below.

If the flow look-up key matches one of the entries of flow look-up table 1290 and the queue-ID field in the entry matches the queue that the VM enqueued the packet on, then the processor of the NIC 1200 determines that the VM NIC driver has classified the packet properly. As such, the processor will re-enqueue the packet on one of the plurality of output queues 3210. In some examples, re-enqueuing a packet on one of the output queues 3210 from the transmission queues may include copying the packet from one of the transmission queues to the output transmission queue. In other examples, re-enqueuing the packet on one of the output queues 3210 may include updating a queue descriptor.

As shown in FIG. 3B, the NIC 1200 places the packet on the output queue 3210B. The packet is then de-queued from the output queue 3210B by another scheduler (not shown) and transmitted to the external network 300. As noted above, each of the hardware output queues 3210 may be assigned to handle a different class of traffic, or a different priority of traffic. Thus, each packet will be handled in accordance with its corresponding rate-limit.

Figure 4C:
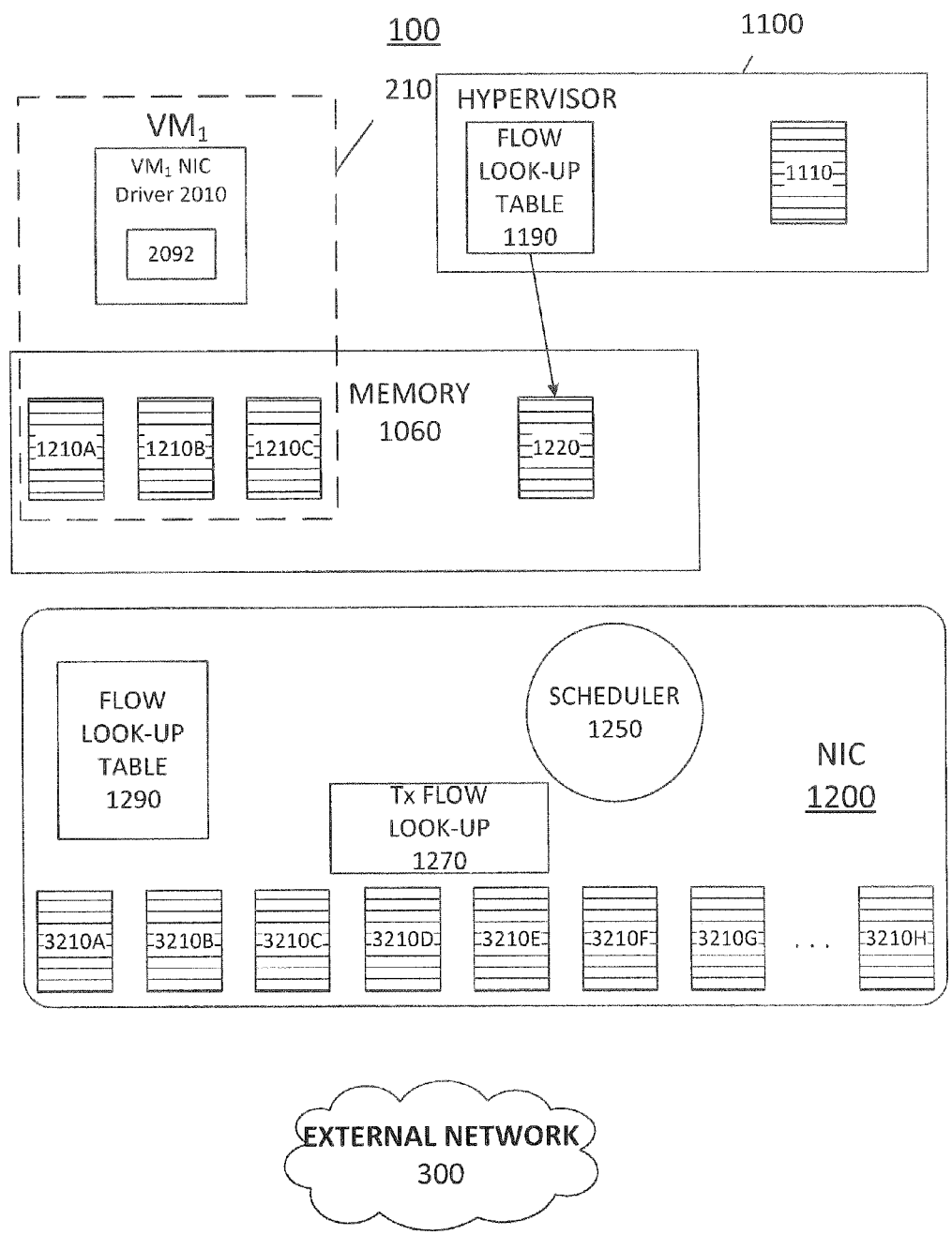

FIGS. 4A-4C show an example where the NIC 1200 routes a packet that has failed a transmission flow look-up to the hypervisor 1100 for further processing. As previously discussed, the trusted host 100 includes a processor (not shown), a memory 1060, a VM 210, a hypervisor 1100, and a NIC 1200. The VM 210 has a VM driver 2010, which includes a transmission look-up table 2092. The VM 230 is not shown in FIGS. 4A-4C for convenience.

The memory 1060 includes transmission queues 1210A, 1210B, 1210C, and 1220. In this regard, transmission queues 1210A, 1210B, and 1210C are allocated to the VM 210. The transmission queue 1220 is allocated to the hypervisor 1100. While FIG. 4A only shows four transmission queues, one of ordinary skill in the art would recognize that each VM and the hypervisor may have more transmission queues allocated thereto.

Similar to the examples discussed above, the NIC 1200 includes a scheduler 1250; a transmission flow look-up 1270; a flow look-up table 1290; and a plurality of hardware output queues 3210. As noted above, each of the output queues 3210 may be dedicated to a particular class of network traffic or a priority associated with the network traffic.

FIG. 4A shows the various data paths that packets may take from the VM to the hypervisor 1100. As shown in, FIG. 4A, the VM driver 2010 may place a packet on one of the plurality of the rate limited hardware transmission queues 1210A, 1210B, or 1210C based on the classification performed by the driver 2010. The scheduler 1250 then dequeues at least a portion the packet placed into one of the transmission queues so that it may be validated by the NIC. As with above, the packets are placed in a high-speed memory (e.g. on-chip buffer or SRAM) via a direct memory access.

Accordingly, a processor or fixed-function hardware of the NIC 1200 may then generate a flow look-up key. The flow look-up key may then used to verify whether the packet was enqueued properly by the VM driver by referring to the entries stored in the flow look-up table 1290.

If the flow look-up key does not match any of the entries in the flow look-up table 1290 or the key matches an entry but the queue-ID in the entry does not match the queue that the packet was placed on, the NIC 1200 routes the packet to software transmission queue 1110 of the hypervisor 1100 for further processing as shown in FIG. 4A. Further, the NIC 1200 may provide an indication to the hypervisor 1100 that the VM driver improperly enqueued the packet.

Referring to FIG. 4B, the hypervisor 1100 performs a flow look-up on the packets enqueued on the software transmission queue 1110. In this regard, the hypervisor 1100 may generate a flow look-up key. The hypervisor 1100 will compare the generated flow look-up key to the entries stored in the flow look-up table 1190. If the generated flow look-up key matches one of the entries in the flow look-up table 1190, the hypervisor may update the flow look-up table 1290 as discussed in greater detail below.

If the generated flow look-up key generated by the hypervisor 1100 does not match any of the entries stored in the flow look-up table 1190, then the hypervisor 1100 has several options. For example, the hypervisor 1100 may drop the packet. In other examples, the hypervisor 1100 may analyze the packet to determine if a new rate limited hardware transmission queue should be allocated to the VM. Alternatively, the hypervisor 1100 may create a software rate-limited queue for the flow, and add the flow to the flow look-up table 1190 with an indication that the flow should use the created software rate-limited queue. Additionally, the hypervisor 1100 may generate a sequence of packets for the NIC 1200 to transmit.

In FIG. 4C, the hypervisor 1100 is shown enqueuing the packet on hardware transmission queue 1220. The NIC 1200 will handle the packets placed in transmission queue 1220 accordingly. That is, the scheduler 1250 will dequeue the packets from the transmission queue 1220 into the high-speed memory of the NIC 1200 as shown in FIG. 3B. The packet may then be transferred to the appropriate hardware output queues 3210 to be transmitted to external network 300. Subsequently, the at least one packet may dequeued from its respective output queue 3210 and transmitted to the external network 300 by a scheduler (not shown).

In other examples, the hypervisor may software rate limit the packet before transmitting it to transmission queue 1220. In this regard, the transmission queue 1220 may have a flag value associated therewith. Accordingly, the hypervisor may set the flag value to indicate that no further look-up is required by the NIC. Furthermore, the flag value may indicate the output queue 3210 to be used to transmit the packet.

Figure 5B:
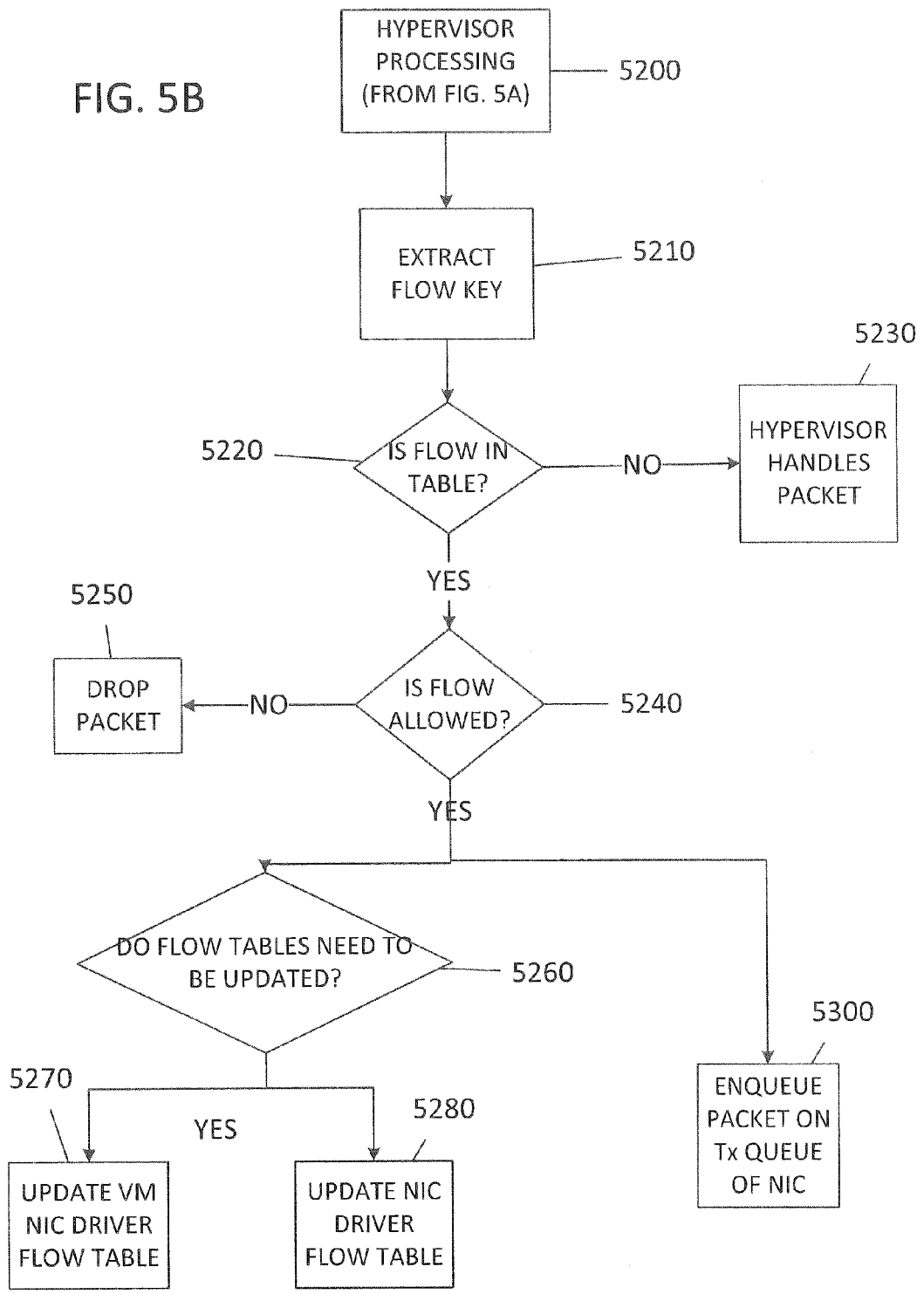

FIGS. 5A and 5B provide an example flowchart of a process 5000 of transmitting a packet according to aspects of the disclosure. The process begins with a VM NIC driver transmitting a packet in block 5010. In block 5020, the VM NIC driver may generate or extract a flow look-up key from data contained in the packet. According to some examples, the flow look-up key may be generated using data extracted from a packet header.

In this regard, a packet contains a header and payload information. The payload contains the data to be transmitted, which may vary from packet to packet. Depending on the protocol used, the header may contain static information, such as the source address, a source port, the destination address, a destination port, etc.

For example, the flow-look up key may be data extracted from the header which is compared to information in the flow look-up table. Additionally, information from the header, such as the source address, may be subjected to a mathematical operation, such as a hash function, in order to generate the flow look-up key. Any combination of static information from the packet header may be extracted and subjected to a mathematical operation to generate the flow look-up key. In some examples, generating the flow look-up key may comprise concatenating information from the header.

In other examples, the flow look-up key may be a value placed in the packet by an application or the VM operating system itself. According to these examples, a value may be placed in one of the available fields in the packet header. Accordingly, the location of the flow look-up key value in the packet header need only be known in order to extract it.

Once the flow look-up key has been generated, the VM NIC driver determines whether the flow look-up key is in a transmission flow look-up table stored in the VM NIC driver in block 5030. In this regard, the transmission flow look-up table may be any suitable table or database capable of indexing and storing information for classifying the appropriate rate limited transmission queue for the packet. Accordingly, the transmission flow look-up table may be stored in CAM, TCAM, SRAM, or any other suitable memory.

If the flow look-up key is not in the VM NIC driver's transmission flow look-up table, the packet is transmitted to the hypervisor in block 5150. The packet is then subjected to further processing by the hypervisor in block 5200, which will be discussed in greater detail below with respect to FIG. 5B. In alternative examples, the NIC may drop the packet without invoking the hypervisor if the look-up key does not appear in the flow-look-up table.

If the generated flow look-up key is present in the VM NIC driver's transmission flow look-up table in block 5030, the VM NIC driver enqueues the packet on one of a plurality of its allocated rate limited transmission queues indicated in the table entry in block 5040. Accordingly, in block 5040 the VM NIC driver bypasses the hypervisor to enqueue the packet directly on the rate limited transmission queue. Alternatively, the VM NIC driver may passthrough the hypervisor in block 5040 to enqueue the packet on the NIC.

In block 5050, a scheduler, as discussed above, dequeues at least a portion of the packets from the rate limited transmission queues. As noted above, any known scheduling algorithm (i.e. round robin) may be used to dequeue packets from the plurality of rate limited transmission queues.

Dequeuing packets from the rate limited transmission queues may involve transferring a portion of the packet from memory to the NIC's high-speed memory via a direct memory access. As discussed above, the high-speed memory may be one of a SRAM or any other type of memory.

In block 5060, the processor of the NIC may extract or generate a flow look-up key according to one of the techniques discussed above. The flow look-up key may be generated according to any of the techniques discussed above. Alternatively, any known type of packet classification technique may be used to determine the appropriate output queue for the packet.

In block 5070, the NIC will then verify that the VM NIC driver classified the packet properly by comparing the generated look-up key stored in the high-speed memory to entries in the flow table stored in the memory of the NIC.

If the look-up key does not appear in the flow table of the NIC, then the packet is forwarded to be processed by the hypervisor in block 5200. In some examples, the NIC may drop the packet. Additionally, the NIC may keep track of the number of packets mis-queued by each VM. The NIC may then forward the count to the hypervisor via a counter-access mechanism for further analysis. In this regard, the hypervisor may compare the count to a threshold value. For example, the threshold value may include a certain number of mis-queued packets in a predetermined amount of time. Additionally, the threshold may include exceeding an amount of bandwidth allocated to the virtual machine or exceeding an amount of bandwidth to communicate with a specific destination. If a VM exceeds a threshold of mis-queued packets, the VM may be reprimanded by the trusted host.

The reprimand for exceeding a threshold of mis-queued packets may range from disabling the VMs ability to bypass the hypervisor to throttling the VMs bandwidth. One of ordinary skill in the art would recognize that other thresholds and consequences could be used to ensure that the VMs queued packets on the appropriate rate limited transmission queue.

If the look-up key generated for the packet matches one of the entries stored in the flow table and the queue-ID field in the entry matches the queue-ID of the queue that the packet was placed on, then the entry may be further evaluated to determine whether additional authorization is required before the packet is transmitted. For example in block 5080, the entry may contain an indication that the packet should be compared to access control lists to determine whether it complies with the permissions granted to the transmitting VM. According to another example, the entry may indicate that the NIC should verify that the VM has not exceeded its permitted bandwidth as a whole. In this regard, the NIC may check that bandwidth has not been exceeded for a source-destination pair. One of ordinary skill in the art would recognize that any combination of the additional processing described above may be applied to the packet. Alternatively, blocks 5060, 5070, and 5080 may be skipped based on a per transmission queue configuration value that is controlled by the hypervisor.

After the packet has been verified as having an entry in the flow look-up table of the NIC and has passed any further processing, the packet is placed on the appropriate output queue to be transmitted to the external network in block 5090.

As noted above with respect to FIGS. 3 and 4, there are a plurality of output queues. A packet can be placed on a particular output queue based upon fields in the packet header, a configuration value associated with the transmission queue, or a value found in the flow table entry. In this regard, each output queue may be for a certain class of rate limited traffic or a certain priority-level of traffic. The output queues can be any type of known queue, including first-in first-out; last-in first-out; transmission ring buffer, etc. Knowing the type of queue used, a scheduling algorithm will be used to dequeue the packets from the output queues and transmit the packets to an external device or network in accordance with the rate limit set for the class of traffic or the priority associated therewith.

If the packet fails the further processing performed in block 5080, a determination is made whether to drop the packet in block 5100. If the packet is to be dropped, the transmission process ends in block 5110. Alternatively, if it is determined that the packet is not to be dropped, the NIC forwards the packet to the hypervisor for additional processing.

Turning to FIG. 5B, a flowchart describing how the hypervisor handles packets is shown. In block 5200, the hypervisor receives a packet from either the VM or the NIC.

In block 5210, the hypervisor may generate a flow look-up key from data contained in the packet according to one of the techniques discussed above. Alternatively, the hypervisor may use information from the packet header to perform the flow look-up directly.

Once the flow look-up key has been obtained, the hypervisor determines whether the flow look-up key is in a master transmission flow look-up table for stored in the hypervisor in block 5220. Similar to the previously discussed transmission flow look-up tables, the master transmission flow look-up table 1190 may be any suitable table or database capable of indexing and storing information for classifying the appropriate rate limited transmission queue for the packet. Accordingly, the transmission flow look-up table may be stored in CAM, TCAM, SRAM, or any other suitable memory.

If the flow look-up key is not in the master transmission flow look-up table the hypervisor may determine how the packet should be handled in block 5230. That is, the hypervisor may further evaluate the packet to determine routing information. For example, if the packet is destined for a VM on the same trusted host, the hypervisor may route the packet to the destination VM. Additionally, the hypervisor may perform an analysis if whether the packet constitutes a new flow in block 5230. As discussed above, this may include determining when a flow should be included in the master transmission flow table, the VM device driver's flow table, and the NIC's flow table; whether the packet should be subjected to software rate limiting; or whether the packet should be dropped. In some examples, the hypervisor may advantageously allocate a rate-limited transmission queue to the VM that is transmitting the new flow or class of traffic.

Further in block 5230, if the hypervisor determines that the packet does not belong to a new flow or a new class of traffic, then the hypervisor determines whether the packet should be transmitted. If the hypervisor determines that the packet should not be transmitted, the packet is dropped. If the hypervisor determines that the packet should be transmitted, the packet may be enqueued on a transmission queue allocated to the hypervisor.

When the flow look-up key is located in the master transmission flow look-up table, the process proceeds to block 5240 where the hypervisor determines if the packet complies with the policies set forth with respect to the class of rate limited traffic. As above with respect to block 5080, the packet may be compared to access control lists, rate limits set for the VM, rate limits set for the source-destination pair, or any other appropriate check. Alternatively, block 5240 may be skipped and the packet may be placed on one of the plurality of output queues.

After the packet has been verified in steps S220 and S240, the hypervisor enqueues the packet on one of the plurality of output queues in block 5300. As noted above, enqueuing the packet on an output queue may include copying the packet into one of the output queues or updating a queue descriptor. Alternatively, the hypervisor may have a certain number of transmission queues allocated to it. Thus, the hypervisor will enqueue the packet on a rate limited transmission queue in block 5300 that is allocated to the hypervisor.

After enqueuing the packet, the hypervisor may make a determination in block 5260 as to whether the flow look-up tables of the VM NIC driver and the NIC need to be updated to include additional flows of traffic. If the flow look-up tables are to be updated, the hypervisor may update the VM NIC driver's flow look-up table in block 5270. Furthermore, if the hypervisor may update the flow look-up table of the NIC in block 5280. In some examples, updating the flow look-up tables includes configuring the rate limit for each of the VM's transmission queues. If the flow look-up tables are not be updated, subsequent packets may pass through the hypervisor. In this regard, the packets may be software rate limited.

Updating the transmission flow look-up table of the VM NIC driver may be done via an interprocess communication or remote procedure call. In some examples, updating the transmission flow look-up table of the NIC involves providing the hypervisor with means to access the transmission flow look-up table 1290. In this regard, the hypervisor may add/remove entries based on a variety of factors (e.g. knowing which entries are used more frequently than others). Various techniques for updating the transmission flow look-up tables would be readily apparent to those of ordinary skill in the art and are not discussed in greater detail herein.

The examples above provide for a NIC that verifies the rate limited enqueuing performed by a VM. This helps to prevent the VM from cheating rate limits imposed by the trusted host. This further prevents malware or other malicious software from communicating with external systems. Thus, the system and method described in the present disclosure optimize network flows by allowing VMs to bypass the hypervisor, while ensuring that the VMs adhere to the rate limits set by the trusted host. Moreover, the system and method provide an added layer of security to a virtual machine environment.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   receiving at least one packet on a rate limited hardware transmission queue from a virtual machine device driver;
   comparing, using one or more processors of a network interface controller (NIC), header information of the at least one packet to a classification table managed by trusted host software;
   determining, using the one or more processors, based on the comparison, whether the at least one packet was properly placed on the rate limited hardware transmission queue; and
   when the one or more processors have determined that the at least one packet was properly placed on the rate limited hardware transmission queue, transferring the packet to one of a plurality of output queues.

2. The method of claim 1, wherein
   comparing header information of the at least one packet to a classification table managed by trusted host software comprises determining whether a flow look-up key associated with the packet matches an entry in a flow table stored in a memory of the NIC.

3. The method of claim 1, further comprising
   determining, using the one or more processors, whether the virtual machine is authorized to send the at least one packet, the determining comprising at least one of:
   determining whether the virtual machine has exceeded a first threshold; or
   checking an access control list.

4. The method of claim 3, wherein the first threshold is an amount of bandwidth allocated to the virtual machine.

5. The method of claim 1, further comprising:
   dropping the at least one packet when it is determined that the at least one packet was not properly placed on the rate limited hardware transmission queue.

6. The method of claim 1, further comprising:
   when the NIC has determined that the at least one packet was not properly placed on the rate limited hardware transmission queue, preventing the virtual machine from bypassing a hypervisor to enqueue packets on the rate limited hardware transmission queue.

7. The method of claim 1, further comprising:
   rate limiting network traffic of the virtual machine; and
   rate limiting a subset of the network traffic intended for a specific destination.

8. The method of claim 1, further comprising:
   dequeuing the at least one packet from the rate limited hardware transmission queue prior to comparing the header information to the classification table; and
   copying the at least one packet to a memory of the NIC.

9. The method of claim 2, further comprising generating, by the one or more processors, the flow look-up key using information extracted from the header information.

10. The method of claim 1, further comprising tracking, by the one or more processors in the NIC, a number of packets misqueued by the virtual machine.

11. The method of claim 1, wherein comparing the header information of the at least one packet to the classification table comprises:
   finding, using the one or more processors of the network interface controller (NIC), a table entry in the classification table managed by the trusted host software that matches the header information of the at least one packet;
   extracting, using the one or more processors, from that table entry an identification of a second rate limited hardware transmission queue; and
   comparing, using the one or more processors, whether the rate limited hardware transmission queue is identical to the second rate limited hardware transmission queue.

12. A system, comprising:
   at least one memory storing at least one rate limited transmission queue configured to receive at least one packet from a virtual machine device driver;

a processor in communication with the at least one memory, the processor configured to:
  compare header information of the at least one packet to a classification table managed by trusted host software;
  determine, based on the comparison, whether the at least one packet was properly placed on the rate limited hardware transmission queue; and
  transfer the packet to one of a plurality of output queues when it is determined that the at least one packet was properly placed on the rate limited hardware transmission queue.

13. The system of claim 12, wherein the classification table comprises
  a transmission flow look-up table stored in the at least one memory.

14. The system of claim 13, wherein the processor is further configured to determine whether the virtual machine is authorized to send the at least one packet, the determining comprising at least one of:
  determining whether the virtual machine has exceeded a first threshold; or
  checking an access control list.

15. The system of claim 14, wherein the first threshold is an amount of bandwidth allocated to the virtual machine.

16. The system of claim 13, wherein the processor is configured to drop the at least one packet when it is determined that the at least one packet was not properly placed on the rate limited hardware transmission queue.

17. The system of claim 13, wherein the processor is further configured to notify a hypervisor when the processor has determined that the at least one packet was not properly placed on the rate limited hardware transmission queue.

18. The system of claim 17, wherein the hypervisor rescinds a right of the virtual machine to bypass a hypervisor.

19. The system of claim 12, wherein the processor is in a network interface controller (NIC) and is further configured to:
  dequeue the at least one packet from the rate limited hardware transmission queue prior to comparing the header information to the classification table; and
  copy the at least one packet to a memory of the NIC.

20. The system of claim 12, wherein the processor is further configured to track a number of packets misqueued by the virtual machine.

21. A non-transitory computer readable medium comprising instructions, that when executed by one or more processors, perform:
  receiving at least one packet on a rate limited hardware transmission queue from a virtual machine device driver;
  comparing, using one or more processors of a network interface controller (NIC), header information of the at least one packet to a classification table managed by trusted host software; and
  determining, based on the comparison, whether the least one packet was properly placed on the rate limited hardware transmission queue.

* * * * *